UNITED STATES PATENT OFFICE.

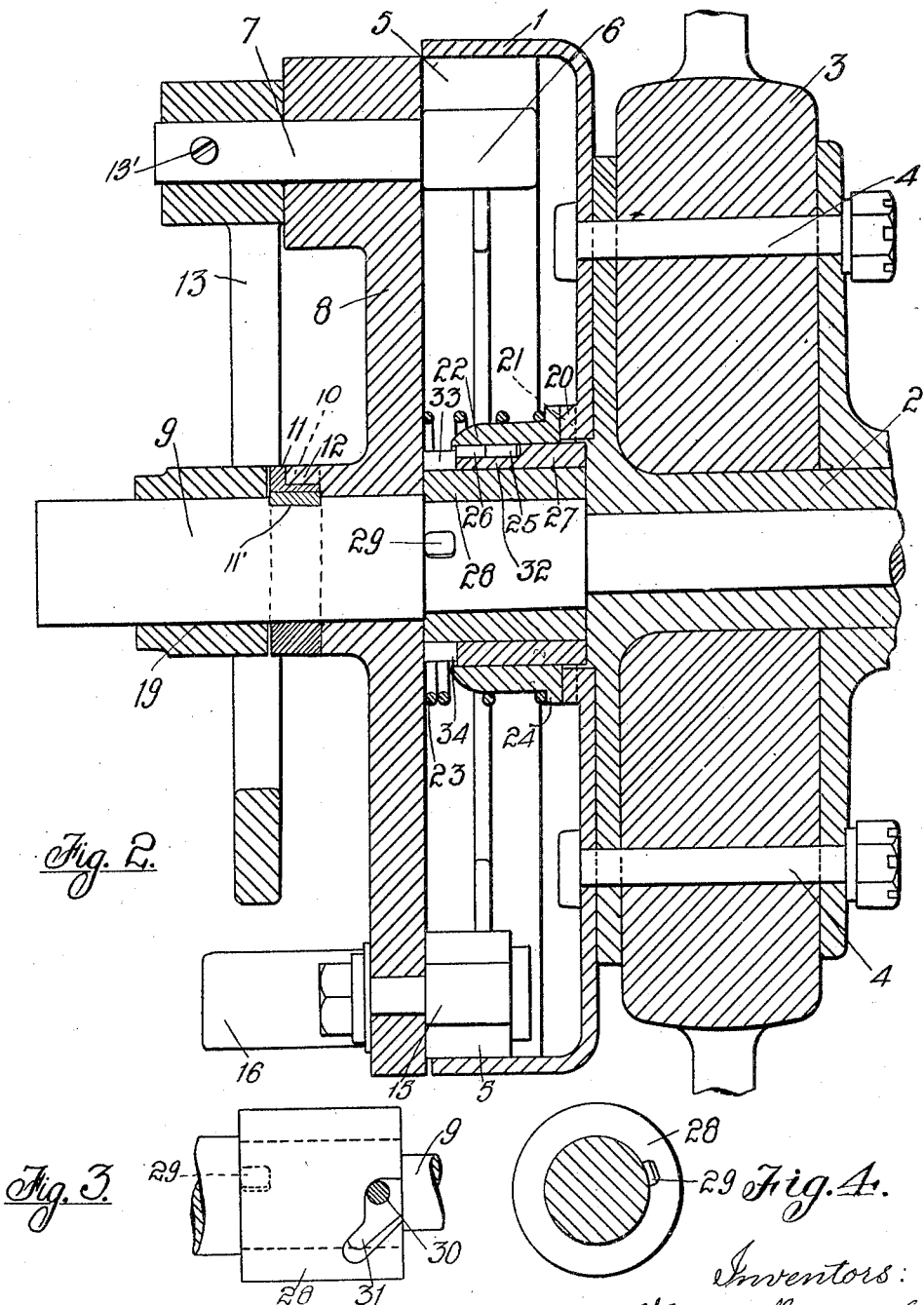

VINCENT BARNINGHAM, OF READING, AND SYDNEY GUY ASHBY, OF EDENBRIDGE, ENGLAND.

AUTOMATIC BRAKE.

1,346,628.  Specification of Letters Patent.  Patented July 13, 1920.

Application filed March 24, 1920. Serial No. 368,440.

*To all whom it may concern:*

Be it known that we, VINCENT BARNINGHAM, a subject of the King of Great Britain and Ireland, residing at Calcot Rise, Reading, in the county of Berkshire, England, and SYDNEY GUY ASHBY, a subject of the King of Great Britain and Ireland, residing at Haxted, Edenbridge, in the county of Kent, England, have invented new and useful Improvements in and Relating to Automatic Brakes, of which the following is a specification.

This invention relates to automatic brakes more particularly applicable to trailer vehicles and has for its object to provide improvements in brakes of this kind whereby the trailer brakes will be applied automatically when a trailer is uncoupled from its tractor and remain applied, when the trailer tends to over-run the tractor and in the event of the tractor brakes being overcome by the weight of the trailer when ascending a hill or stopping thereon.

The brake used may be of the internal expanding or external contracting type and the brake actuating means are connected to an eye having sliding engagement with the drawbar of the trailer, in such a manner that any movement tending to pull or push the drawbar eye is transmitted through connections to the brake actuating means. These means which remain inoperative as long as a pull is exercised are adapted to be automatically released to apply the brakes when a push is exercised on the drawbar eye. By this arrangement the brakes are applied to the trailer automatically when the tractor is stopped or if the trailer tends to overrun the tractor. Improvements in the brake applying mechanism itself provide means for applying the brakes automatically when the trailer moves backward.

Reference will now be made to the accompanying drawings in which:—

Fig. 2 is a cross sectional elevation taken on the line A B of Fig. 1 and

Fig. 3 is a side view, and

Fig. 4 is an end view, of the sleeve 28.

Figure 1:
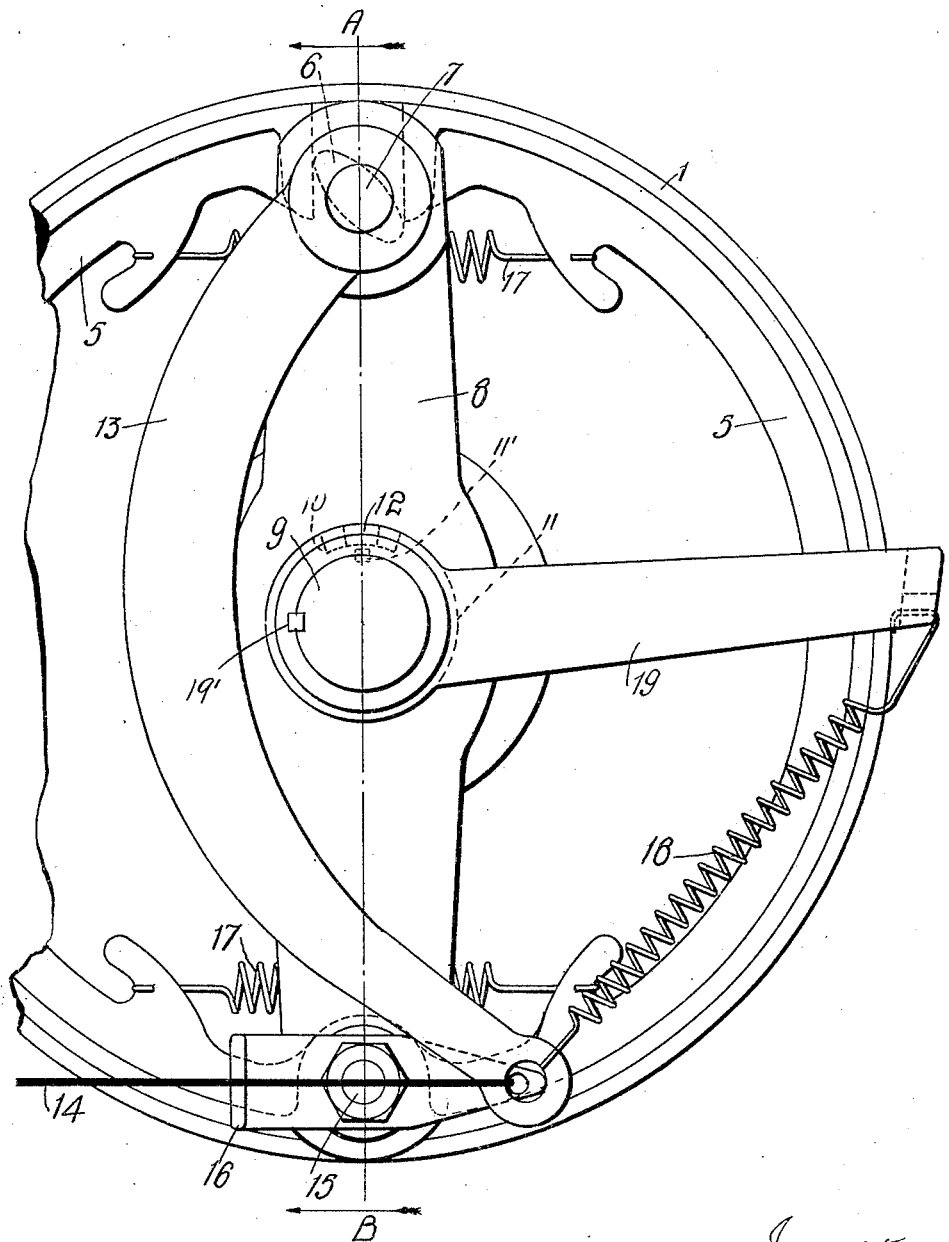
Figure 1 is an elevation of a brake constructed according to the invention.

A brake drum 1 is secured to the hub 2 of a wheel 3 of a trailer by bolts 4 or other suitable means and carries a pair of brake shoes 5 adapted to engage its inner rim when their ends are urged apart by rotary movement of a cam 6. This cam is mounted on a shaft 7 carried at one end of an arm 8 mounted on the axle 9 on which it is free to rotate within the limits of stops 10 formed on a fixed collar 11, the arm being provided with a tooth 12 adapted to be engaged by said stops as hereinafter described.

Fixed to the shaft 7 is a lever 13 the free end of which is connected to the draw bar eye (not shown) by a cable 14 or a rod. The ends of the brake shoes 5 remote from the cam 6 bear against the inner end of a bolt 15 secured at one end of the arm 8. A stop 16, the purpose of which will be described hereinafter, may be secured in position by the nut on the bolt 15 or may be secured to the mechanism in any other convenient manner. The brake shoes are normally held inoperative by the action of springs 17 attached in any suitable manner to said shoes. The lever 13 is normally urged in a direction to apply the brakes *i. e.* toward the right, Fig. 1, by a spring 18 attached to said lever at the same point as the cable 14 and connected at its opposite end to an arm 19 fixed to the axle 9 or to any fixed part of the trailer chassis. The arm 19 is secured to the stationary axle 9 by a key 19′; and the collar 11 is secured to the said axle by a key 11′. The lever 13 is secured to the cam shaft 7 by a pin 13′.

At the center of the brake drum 1 is formed an annular ring of ratchet teeth or dogs 20 adapted to be engaged for a purpose hereinafter described, by a second and similar ring 21 formed on the inner end of a sleeve 22 normally urged toward the ring 20 by a spring 23 bearing against a shoulder 24 on said sleeve and against the inner surface of the arm 8. The sleeve 22 is capable of axial and partial rotary movement with respect to the axle, a stud 25 on its internal periphery engaging a longitudinal slot 26 on a second sleeve 27, said slot extending to the outer end of the sleeve to facilitate disassembly of the parts. The sleeve 27 is capable of axial and partial rotary movement with respect to the axle by means of a pin 30 and slot connection with a sleeve 28 locked to the axle by a key or the like 29 which enters a corresponding groove in the axle. The pin and slot connection referred to is shown in Fig. 3 wherein 30 indicates a pin disposed on the internal periphery of the sleeve 27 and 31 an angular slot formed in the sleeve 28.

The sleeve 27 is provided on its outer side with lugs 32 preferably two in number engaging slots 33 formed in a ring 34 on the arm 8.

The operation of the braking device is as follows:—

During starting of the trailer the pull exerted on the draw bar eye by the tractor is transmitted through the cable 14 to the arm 13 which is moved toward the left, Fig. 1, against the action of its spring 18. In this manner the wheel and brake drum are allowed to run freely as long as the cable 14 is maintained in a taut condition, the ratchet members being arranged so that the ring 20 can slip relatively to the ring 21 during forward movement of the trailer.

Should the tractor be stopped, the cable 14 will be slackened and the spring 18 will draw the arm 13 toward the right, Fig. 1, whereby the cam 6 will expand the brake shoes into engagement with the inner surface of the drum 1, to stop the trailer.

In the event of the trailer overrunning the tractor, as for example when descending a hill, the operation of the brakes will be as above described.

Should the trailer become detached from the tractor when ascending a hill, the operation of the brakes will also be as above described. Should the tractor, however, commence to run backward in similar circumstances, the brakes will be applied in the following manner:—Rotation of the wheel and brake drum in a direction the reverse of normal will cause the ratchet teeth or dogs 20 and 21 to engage so that the sleeve 22, the arm 8, the camshaft end of the lever 13, the brake shoes 5 and their accessory parts will be rotated with the brake drum in a clockwise direction, Fig. 1 leaving the lower end of the lever 13 in its original position, thereby altering the position of the cam relatively to the ends of the brake shoes and applying the brakes in the usual way. The rotary movement of the arm 8 is limited by that of its tooth 12 moving between the fixed stops 10. At the moment when the brake shoes engage the drum the ratchets 20 and 21 are automatically disengaged to prevent breakage of the teeth under the strain which would otherwise be imposed upon them should any slip occur between the brake shoes and drum when the brakes were fully applied, this disengagement being effected owing to the fact that the pin 30 which during the rotary movement of the arm 8 slides along the portion of the slot at right angles to the axis of rotation, is suddenly diverted from this path by the bent portion of the slot. This divergence causes the sleeve 27, which carries the pin 30, to be moved toward the left, Fig. 2, taking with it the sleeve 27 owing to the stud and slot connection 25 and 26, and withdrawing the ratchet ring 21 from engagement with the ring 20. The connections are thereby saved from excessive strain without interfering with the set position of the brake shoes. To release the wheel again it is only necessary to exert a sufficient pull on the cable 14 to overcome the action of the spring 18.

To enable the brakes to be released in order that the trailer may be backed or otherwise maneuvered when desired a hand lever or wheel may be connected to the cable 14 so that the lever 13 may be operated by hand when the vehicles are at a standstill or when the trailer is uncoupled from its tractor. This operation is effected by pulling the cable 14 until the lever 13 is drawn into engagement with the stop 16, the pull being continued to cause partial rotation of the entire device in a clockwise direction Fig. 1, thereby withdrawing the dogs 21 from engagement with the dogs 20. The hand wheel or lever by which this operation is performed is then locked in position by any suitable means leaving the brake drum 1 and wheel free to rotate in either direction. During the above operations the spring 18 is extended so that upon release of the cable 14 the parts will return to normal position under the influence of said spring.

It will be obvious that devices other than those described, may be employed to effect the disengagement of the dogs 20 and 21, such for example as a three start thread arrangement and that various other modifications may be made in regard to details of construction without departing from the spirit of the invention.

When the invention is applied to brakes in which shoes engage a drum externally, it is obvious that a construction similar to that above described may be employed, the lever 13 being arranged, when pulled by the draw bar connection, to urge the ends of the brake shoes apart instead of allowing them to approach more closely together as in the case above described.

We claim:—

1. In an automatic brake, a non-revoluble axle, a road wheel revoluble on the axle, a brake drum revolving with the road wheel, an arm carried by the axle, brake shoes pivoted at one end to the said arm and engaging with the brake drum when forced apart, a lever pivoted to the other end of the said arm from the brake shoes and provided with means for forcing them apart, a spring for applying the brake connected to the free end portion of the said lever, and a draft attachment also connected to the free end portion of the said lever and while in operation preventing the said spring from actuating the lever and applying the brake.

2. In an automatic brake, a non-revoluble axle, a road wheel revoluble on the axle, a brake drum revolving with the road wheel, an arm carried by the axle, brake shoes pivoted at one end to the said arm and engaging with the brake drum when forced apart, a lever pivoted to the other end of the said arm from the brake shoes and provided with means for forcing them apart, an anchor arm secured to the axle and arranged at an angle to the said lever, a spring for applying the brake secured between the free end portion of the said lever and the anchor arm, and a draft attachment also connected to the free end portion of the said lever and while in operation preventing the said spring from applying the brake.

3. In an automatic brake, a non-revoluble axle, a road wheel revoluble on the axle, a brake drum revolving with the road wheel, an arm carried by the axle, friction brake mechanism carried by the said arm and adapted to engage with the brake drum, a pivoted lever for releasing the brake also carried by the said arm, a spring for applying the brake, a sleeve mounted on the axle and operatively connected with it by a pin and slot connection, disengageable dogs operatively connected with the said brake drum, means whereby the said pin and slot connection causes the disengagement of the said dogs after the brake is applied, and a draft attachment connected to the said lever and while in operation preventing the brake from being applied by the said spring.

4. In an automatic brake, a non-revoluble axle, a road wheel revoluble on the axle, a brake drum revolving with the road wheel, an arm mounted to oscillate to a limited extent on the said axle, friction brake mechanism operatively connected with the said arm and adapted to engage with the brake drum, a lever pivotally supported by the said arm and adapted to release the brake, a spring for applying the brake, a draft attachment connected to the said lever, means for maintaining the brake inoperative while the draft attachment is in operation, and means for clutching the said arm to the said axle to apply the brake when the road wheel is moved rearwardly.

5. In an automatic brake, a non-revoluble axle, a road wheel revoluble on the axle, a brake drum revolving with the road wheel, an arm mounted to oscillate to a limited extent on the said axle, friction brake mechanism operatively connected with the said arm and adapted to engage with the brake drum, a lever pivotally supported by the said arm and adapted to release the brake, a spring for applying the brake, an inner sleeve connected to the said arm and mounted concentric with the axle and operatively connected with it by a pin and slot connection, an outer sleeve mounted to slide longitudinally and to oscillate on the inner sleeve and provided at one end with dogs, dogs on the brake drum, a spring normally holding the dogs on the sleeve in engagement with the dogs on the brake drum, and a draft attachment connected to the said lever.

6. In a device for automatically applying brakes to trailer vehicles, a brake drum rotatable with a road wheel, brake shoes coöperating with said drum, a brake operating lever, a flexible connection operatively connected with the said lever, a spring urging said lever into brake applying position, a pivot for said lever mounted concentrically with the wheel axle, means to enable said pivot to rotate in a rearward direction, and means whereby the pivotal end of said lever changes it position to cause application of the brakes when the vehicle moves backwardly.

7. In a device for automatically applying brakes to trailer vehicles, an axle, a brake drum rotatable with a road wheel, brake shoes coöperating with said drum, a brake operating lever, a flexible connection operatively connected with the said lever, a spring urging said lever into brake applying position, a pivot for said lever, means mounted upon said axle supporting said pivot, dogs on said brake drum and dogs on said pivot supporting means, and a stop for limiting the backward rotation of said pivot supporting means.

8. In a device for automatically applying brakes to trailer vehicles, an axle, a brake drum rotatable with a road wheel, brake shoes coöperating with said drum, a brake operating lever, a flexible connection operatively connected with the said lever, a spring urging said lever into brake applying position, a pivot for said lever, means mounted upon said axle supporting said pivot, dogs on said brake drum and dogs on said pivot supporting means, and means for withdrawing the second named dogs from engagement with the first named set when the brakes have been applied.

9. In a device for automatically applying brakes to trailer vehicles, a brake drum rotatable with a road wheel, an axle, brake shoes coöperating with said drum, brake shoe actuating means, a flexible connection operatively connected with the said actuating means, a sleeve fixed to said axle, a second sleeve concentric with the first sleeve, a pin and slot connection between said sleeves, dogs on said brake drum, dogs coöperating with said first named dogs to apply said brake shoes to said drum, and means whereby said pin and slot connection causes disengagement of said dogs after application of the brakes.

10. In a device for automatically applying brakes to trailer vehicles, a brake drum rotatable with a road wheel, an axle, brake shoes coöperating with said drum, brake shoe actuating means, a flexible connection operatively connected with the said actuating means, a sleeve fixed to said axle, a second sleeve concentric with the first sleeve, a pin and slot connection between said sleeves, a third concentric sleeve, a sliding connection between the second and third sleeves, dogs on said third sleeve, dogs on said brake drum, and means for causing said dogs to coöperate and cause application of the brakes when the vehicle moves rearwardly.

11. In a device for automatically applying brakes to trailer vehicles, a brake drum rotatable with a road wheel, an axle, brake shoes coöperating with said drum, brake shoe actuating means, a flexible connection operatively connected with the said actuating means, a sleeve fixed to said axle, a second sleeve concentric with the first sleeve, a pin and a slot connection between said sleeves, a third concentric sleeve, a sliding connection between the second and third sleeves, dogs on said third sleeve, dogs on said brake drum and spring means for causing said dogs to coöperate and cause application of the brakes when the vehicle moves rearwardly.

12. In a device for automatically applying brakes to trailer vehicles, a brake drum rotatable with a road wheel, an axle, brake shoes coöperating with said drum, brake shoe actuating means, a flexible connection operatively connected with the said actuating means, a sleeve fixed to said axle, a second sleeve concentric with the first sleeve, a pin and slot connection between said sleeves, a third concentric sleeve, a sliding connection between the second and third sleeves, dogs on said third sleeve, dogs on said brake drum, and an arm loosely mounted on said axle carrying said brake shoe actuating means and connected to said second sleeve.

13. In a device for automatically applying brakes to trailer vehicles, a brake drum, an axle, means for securing said drum to said axle, brake shoes coöperating with said drum, a brake operating lever, a flexible connection operatively connected with the said lever, a pivot for said lever, an arm loosely mounted on said axle carrying said pivot, means for preventing movement of said arm during forward movement of the vehicle, and means to allow partial rotation of said arm to cause application of the brakes during rearward movement of the vehicle.

14. In a device for automatically applying brakes to trailer vehicles, a brake drum, an axle, means for securing said drum to said axle, brake shoes coöperating with said drum, a brake operating lever, a flexible connection operatively connected with the said lever, a pivot for said lever, an arm loosely mounted on said axle carrying said pivot, a sleeve concentric with said axle and secured thereto, a second sleeve capable of longitudinal and partial rotary movement relatively to said first sleeve, a third sleeve slidable relatively to said second sleeve, dogs on said third sleeve, dogs on said brake drum, and means to cause application of said brake shoes to said drum on backward movement of the vehicle.

15. In a device for automatically applying brakes to trailer vehicles, a brake drum, an axle, means for securing said drum to said axle, brake shoes coöperating with said drum, a brake operating lever, a flexible connection operatively connected with the said lever, a pivot for said lever, an arm loosely mounted on said axle carrying said pivot, a sleeve concentric with said axle and secured thereto, a second sleeve capable of longitudinal and partial rotary movement relatively to said first sleeve, a third sleeve slidable relatively to said second sleeve, dogs on said third sleeve, dogs on said brake drum, and fixed stops to limit the movement of said arm during rearward partial rotation to apply the brakes.

16. In a device for automatically applying brakes to trailer vehicles, a brake drum, an axle, means for securing said drum to said axle, brake shoes coöperating with said drum, a brake operating lever, a flexible connection operatively connected with the said lever, a pivot for said lever, an arm loosely mounted on said axle carrying said pivot, a sleeve concentric with said axle and secured thereto, a second sleeve connected to said arm, a third sleeve secured to said axle, a pin carried by said second sleeve, a slot having an offset portion in the third sleeve and engaging said pin, dogs on said third sleeve, dogs on said brake drum, and a spring causing said dogs to engage and apply the brakes upon backward movement of the vehicle.

17. In a device for automatically applying brakes to trailer vehicles, a brake drum, an axle, means for securing said drum to said axle, brake shoes coöperating with said drum, a brake operating lever, a flexible connection operatively connected with the said lever, a pivot for said lever, an arm loosely mounted on said axle carrying said pivot, fixed stops limiting the movement of said arm, a sleeve concentric with said axle and secured thereto, a second sleeve connected to said arm a third sleeve secured to said axle, a pin carried by said second sleeve, a slot having an offset portion in the third sleeve and engaging said pin, dogs on said third sleeve, dogs on said brake drum, and a spring causing said dogs to engage and apply the brakes upon backward movement of the vehicle.

18. In a device for automatically applying brakes to trailer vehicles, an axle, a brake drum secured to said axle, brake shoes adapted to coöperate with said drum, an arm loosely mounted on said axle, a brake shoe operating lever pivoted on said arm, a flexible connection operatively connected with the said lever, means maintaining said brake shoes inoperative while said connection is taut and means for clutching said arm to said axle to cause application of said shoes to said drum upon backward movement of said vehicle.

19. In a device for automatically applying brakes to trailer vehicles, an axle, a brake drum secured to said axle, brake shoes adapted to coöperate with said drum, an arm loosely mounted on said axle, a brake shoe operating lever pivoted on said arm, a brake shoe expanding cam carried by said arm, a flexible connection operatively connected with the said lever, means whereby slackening of said connection causes operative expansion of said brake shoes, and means for clutching said arm to said axle to cause rotation of the pivot and operative expansion of said brake shoes upon backward movement of the vehicle.

20. In a device for automatically applying brakes to trailer vehicles, an axle, a brake drum secured to said axle, brake shoes adapted to coöperate with said drum, an arm loosely mounted on said axle, a brake shoe operating lever pivoted on said arm, a brake shoe expanding cam carried by said arm and operated by said lever, a spring urging said lever into brake applying position, a flexible connection operatively connected with the said lever and normally opposing the action of said spring, a sleeve concentric with and slidable relatively to said axle, dogs on said sleeve, dogs on said brake drum, a spring causing engagement of said dogs on backward rotation of said drum, a second sleeve within the first named sleeve, a connection between said second sleeve and said arm, a third sleeve within the second, means securing said third sleeve to said axle, a pin and slot connection between the second and third sleeves, and means whereby said pin and slot connection causes disengagement of said dogs after application of the brakes.

In testimony whereof we affix our signatures.

VINCENT BARNINGHAM.
SYDNEY GUY ASHBY.